United States Patent [19]

Shuey et al.

[11] Patent Number: 4,938,545

[45] Date of Patent: Jul. 3, 1990

[54] ABS SOLENOID/ISOLATION VALVE INTEGRATION INTO SINGLE-ENDED SOLENOID BODY, USING PUMP PRESSURE ACTUATION

[75] Inventors: Lyle W. Shuey, Pendleton, Ind.; Edward J. DeHoff, Huber Heights, Ohio; Donald E. Schenk, Vandalia, Ohio

[73] Assignee: General Motors Corporation, Detroit, Mich.

[21] Appl. No.: 322,139

[22] Filed: Mar. 13, 1989

[51] Int. Cl.5 .......................... F16B 13/44; B60T 8/36
[52] U.S. Cl. ................................ 303/119; 137/596.17; 303/84.2
[58] Field of Search ...................... 303/84.2, 113, 116, 303/117, 119, 115; 137/596.17, 637.2

[56] References Cited

U.S. PATENT DOCUMENTS

| | | | |
|---|---|---|---|
| 3,989,063 | 11/1976 | Brouwers et al. | 303/119 |
| 4,668,024 | 5/1987 | Nakanishi et al. | 303/119 |
| 4,679,589 | 7/1987 | Inden et al. | 303/119 X |
| 4,765,693 | 8/1988 | Stegmaier | 303/119 |
| 4,768,843 | 9/1988 | Baughman | 303/116 |
| 4,778,227 | 10/1988 | Bayliss | 303/119 X |
| 4,789,208 | 12/1988 | Kohno | 303/119 X |
| 4,821,770 | 4/1989 | Parrott et al. | 303/119 X |

Primary Examiner—Douglas C. Butler
Assistant Examiner—Matthew C. Graham
Attorney, Agent, or Firm—Ernest E. Helms

[57] ABSTRACT

An anti-lock braking system (ABS) solenoid/isolation valve integration is provided. When ABS is entered, the ABS supply pump is turned on and the solenoid normally open port is closed to prevent fluid from entering the wheel brake area from either the master cylinder or pump. The normally closed valve is then energized (opened) which releases pressure from the wheel causing a pressure drop across the isolation valve. The above causes the isolation valve to move closing a ball seat valve which isolates the master cylinder (pedal) from the wheel (pump, solenoid, etc.). The actual movement of the isolation valve is caused by the pressure generated by the pump.

8 Claims, 3 Drawing Sheets

ABS SOLENOID/ISOLATION VALVE INTEGRATION INTO SINGLE-ENDED SOLENOID BODY, USING PUMP PRESSURE ACTUATION

FIELD OF THE INVENTION

The field of the invention is that of vehicle anti-lock brake apparatus and method of utilization thereof. The disclosure of copending U.S. patent application Parrot et al is incorporated by reference herein. An excellent example of a vehicle anti-lock brake apparatus can be found in Baughman et al U.S. Pat. No. 4,768,843.

DISCLOSURE STATEMENT

The isolation valve is a device which provides the function of isolating the master cylinder from the wheel brake cylinder during an anti-lock brake (ABS) stop. This prevents the driver from feeling any pedal "flutter" which occurs during ABS as a result of pressure changes caused by rapid cycling of a solenoid valve in the brake circuit. Pedal feedback may be felt as either a rise or drop when the isolation valve moves at the beginning and end of the cycle depending on how the equalizer valve is proportioned. However, there will be no feedback due to solenoid cycling.

The isolation valve function is normally packaged as a separate device in the master cylinder body or brake modulator body (machine body).

SUMMARY OF THE INVENTION

The present invention is different from traditional approaches in that the isolation valve is integrated in with the solenoid housing. The isolation valve required to perform in this mechanization consists of a roughly cylindrical piece of material (metal, plastic, etc.) with holes and ball valves allowing for fluid passage, and two O-ring seals allowing passage isolation. One O-ring interfaces with the solenoid housing, while the other interfaces with the machine body (main ABS actuator housing).

When ABS is entered, the ABS supply pump is turned on and the solenoid normally open port is closed to prevent fluid from entering the wheel brake area from either the master cylinder or pump. The normally closed valve is then energized (opened) which releases pressure from the wheel causing a pressure drop across the isolation valve. The above causes the isolation valve to move closing a ball seat valve which isolates the master cylinder (pedal) from the wheel (pump, solenoid, etc.). The actual movement of the isolation valve is caused by the pressure generated by the pump in one version or the master cylinder in an alternative version. Thus the term "pump pressure actuation" or "master cylinder actuation" is utilized.

There are several benefits to the integrated isolation valve concept including; reduced number of hardware pieces, elimination of the machine body bores necessary to house the separate isolation valve assembly, and the ability to provide the entire solenoid/isolation valve assembly as a packaged unit for vehicle assembly.

It is an object of the present invention to provide a solenoid/isolation valve integration into a single ended solenoid body using pump pressure actuation for use in an anti-lock braking system including a master cylinder, wheel cylinder, a reservoir, and a fluid pump, the valve including a housing for mounting the solenoid valve and the isolation valve, the housing including fluid connection for the master cylinder, wheel cylinder, reservoir and pump, the housing also having a first fluid path connecting the master cylinder to the wheel cylinder with a ball seat, a second fluid path intersecting the first fluid path connecting with the pump, a third fluid path intersecting with the first fluid path and connecting with the reservoir, a fourth fluid path connecting the wheel with the master cylinder, a first solenoid having a first solenoid actuated plunger and valve member for controlling fluid communication in the first fluid path between the intersection of the first and second fluid paths and the wheel cylinder connection, the first solenoid having a normally open position, a second solenoid having a second solenoid actuated plunger on the same side of the first and second solenoids as the first solenoid plunger, and the second solenoid plunger having a second valve member for controlling fluid communication in the third fluid path having a normally closed position, a check valve mounted within the fourth fluid passage allowing flow from the wheel cylinder to the master cylinder, an isolation valve including a spool positionally biased within the second fluid path and a ball contacted by the spool, the ball being nested in the seat in the first fluid path and the spool having integral therein a check valve allowing flow from the pump toward the intersection of the first and second fluid paths, whereby the isolation valve during normal brake operation allows fluid flow between the master cylinder and the wheel cylinder and when the pump is activated in an anti-lock braking system mode the pump causes the isolation valve to slide within the first fluid path to push the ball against the valve seat isolating the master cylinder from the brake cylinder and allowing flow from the pump to the wheel cylinder in an anti-lock mode.

It is an object of the present invention to provide a method of using a pressurized fluid source to activate an isolation valve of an anti-lock braking system solenoid-/isolation valve integration utilizing a single ended solenoid body wherein the anti-lock braking system includes a master cylinder, wheel cylinder, reservoir, and a pump, the method including housing the solenoid valve and the isolation valve in a common housing which includes fluid connections for a master cylinder, wheel cylinder, reservoir, pressurized fluid source and a first fluid path connecting the master cylinder to the wheel cylinder, a second fluid path intersecting the first fluid path and connecting with the pressurized fluid source and a third fluid path intersecting with the first fluid path and connecting with the reservoir, controlling fluid communication within the first fluid path by a first solenoid having a plunger and valve member in the first fluid path between the intersection of the the first and second fluid paths and the wheel cylinder and biasing the first solenoid plunger to an open position, controlling fluid communication in the third fluid path with a second solenoid housing normally closed plunger and valve member being positioned on the same side of the first and second solenoids as the first solenoid plunger, and mounting within the intersection of the first and second fluid paths means allowing fluid flow between the the master cylinder and the wheel cylinder in normal braking operation and isolating the first fluid path from the fluid cylinder when the pump is turned on in an anti-lock braking system mode.

Further objects, desires and advantages of the present invention can become more apparent to those skilled in the art as the nature of the invention is better understood from the accompanying drawings and a detailed description.

DETAILED DESCRIPTION OF THE DRAWINGS

Figure 1:
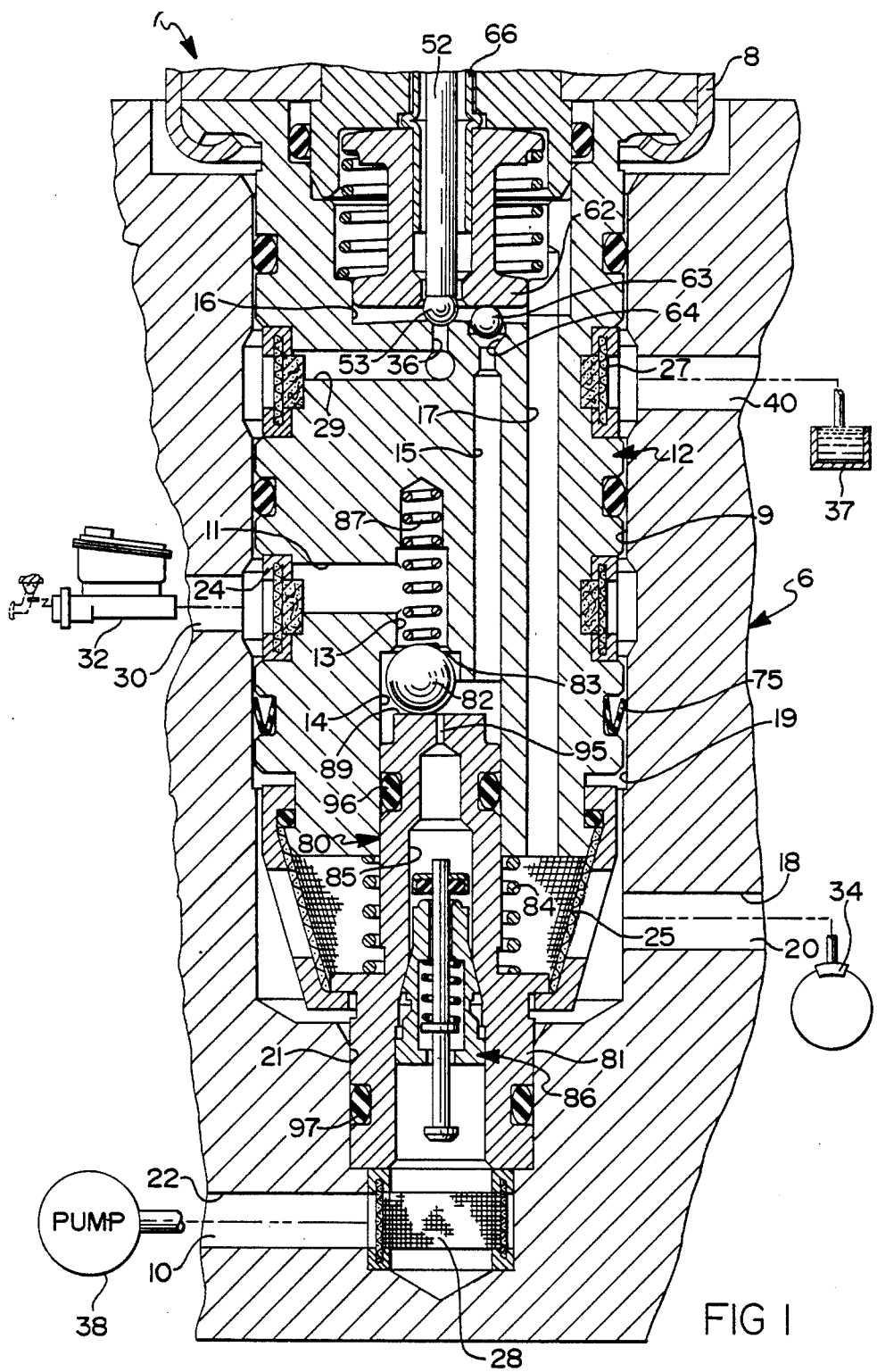
FIGS. 1 and 1a represent a first embodiment.
Figure 1A:
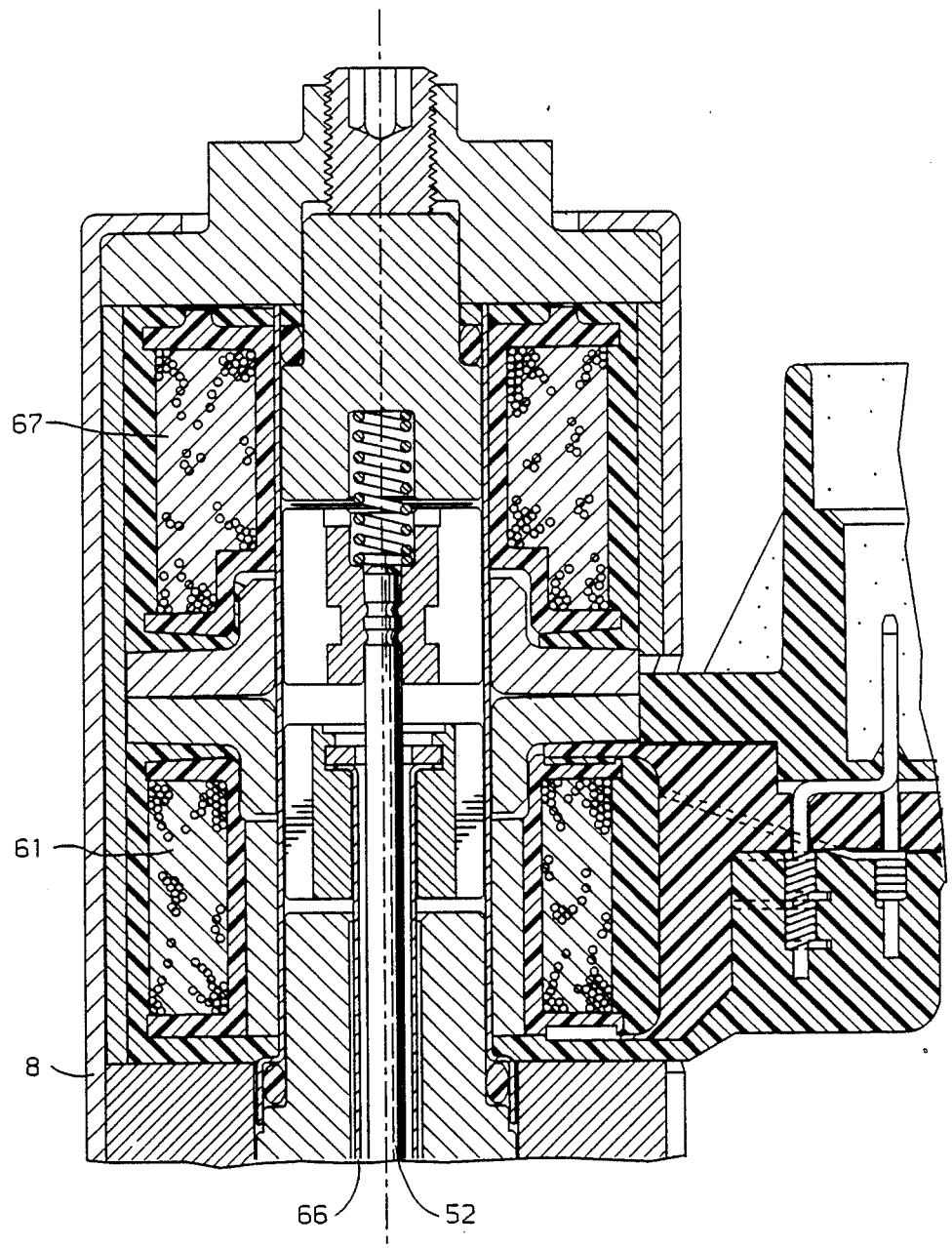

Referring to FIG. 1 and 1A the anti-lock braking system solenoid/isolation valve integration 7 has an ABS machine body or actuator housing 6. The housing 6 has mounted thereto a solenoid or inner housing 12 with first 61 and second 67 61 solenoid coils in similar to that shown in and described in Parrot et al U.S. Pat. No. 4,860,794. The first 61 and second 67 solenoids are surrounded by a casing 8. The first solenoid coil 61 activates a generally cylindrical stem 66 which contacts annular valve member 62 which in turn presses valve member or ball 63. The second solenoid coil 67 activates a second valve stem 52 which extends through the first valve member 62 and has integrally joined thereto a second valve member 53. The first 62 and second 52 valve plungers are on a common side of the first and second solenoid coils 61, 67.

The solenoid/isolation valve integration 7 is used in an anti-lock braking system. The anti-lock braking system also includes a master cylinder 32, a wheel cylinder 34 (Note: the term "wheel cylinder" as used in this application refers to drum-type brake cylinders or calipers of a disc type brake), a brake fluid reservoir 37, and a pressurized fluid source (not shown). Typically, the pressurized fluid source 38 will be a hydraulic pump or an accumulator which is fed by a hydraulic pump.

The housing 6 mounts the solenoid valve casing 8 and a isolation valve 80. The housing 6 has fluid connections for the reservoir 40, the master cylinder 30, the wheel cylinder 20 and the pump 10. The housing 6 has a bore 9 with the inner housing 12 mounted therein. A first fluid path is provided by radial bore 11, bore 13, bore 14, bore 15, bore 16, bore 17 and radial bore 18 to connect the master cylinder connection 30 with the wheel cylinder connection 20. A valve seat 83 is provided between bores 13 and 14. A valve seat 64 for the ball 63 associated with the first valve plunger 62 is located within a narrowed portion of bore 15. A spring 87 biases a ball 82 away from the valve seat 83. Filters 24, 25, 27 and 28 are provided in an attempt to keep the fluid within the solenoid/isolation valve integration 7 as clean as possible.

Intersecting the first fluid path is a second fluid path provided by radial bore 22, bore 21 and bore 14. The second path connects with the pump connection 10. The first fluid path is also intersected with a third fluid path provided by bore 16, bore 36 and radial bore 29. The third fluid path leads to the reservoir connection 40. The intersection of the third fluid path with the first fluid path is after the intersection of the first and second fluid paths but prior to the connection of the wheel 20. A forth fluid path 19 along the outer circumference of the inner housing 12 past V-seal 75 is provided between the wheel cylinder 20 and the master cylinder 30 connections.

Fluid communication through the first fluid passage is controlled by the first solenoid valve and its associated valve member 62 and ball 63. The second solenoid valve stem 52 and valve member 53 (shown in the normally closed position) controls fluid communication through the third fluid path. Slidably and sealably mounted within the second fluid path bores 14 and 21 is the isolation valve 80. The isolation valve 80 has a larger section 81 slidably and sealably mounted within a bore 21 of the housing 6. The isolation valve 80 has a surface 89 for contact with the ball 82. The isolation valve 80 is positionally biased by a return spring 84, located within a multidiametered internal bore 85 of the isolation valve 80 is a check valve 86. Check valve 86 allows fluid flow towards the intersection of the first and second path but does not allow fluid flow from the master cylinder 32 to the pump 38. At the end of interior bore 85 of the isolation valve spool is an orifice 95 providing a pressure build-up. Axially aligned O-rings 96 and 97 seal the isolation valve within housing 6 and inner housing 12, respectively.

Under normal brake apply, fluid from the master cylinder 32 enters the housing through the master cylinder connection 30 and passes over the ball 82 and up the bore 15, past the ball 63 and then down bore 17 exiting a screen through the wheel cylinder connection 20. On release of the brakes the fluid will return through the wheel connection 20 to forth fluid path 19 compressing the V-seal 75. The fluid will then return to the master cylinder 32 via connection 30. If desired, a separate bore in the housing 6 along with an included check valve could replace the return forth passage 19.

Flow from the master cylinder, 32 to the pump 38 is prevented by the check valve 86.

When the vehicle goes into an impending skid, an electronic control module (not shown) signals the solenoids 1 and 2 and fluid pump. The above causes the ball 63 to mate with seat 64. At the same time the fluid pump is turned on to provide fluid pressure for the ABS stop. The second stem 52 is lifted removing valve member 53 from bore 36 thereby releasing pressure from the wheel cylinder 34 back to the reservoir 37. The above-mentioned change in pressure at the wheel cylinder along with the already high pressure at the pump causes the isolation valve 80 to move into the inner housing 12 until the ball 82 mates with seat 83. Ball 82 closes the access from the master cylinder 32 to the bore 14 isolating the master cylinder 32 from the pump 38 and wheel cylinder 34. Thus the term, "PUMP Pressure Actuation" is associated with the solenoid/isolation valve integration 7. The ABS cycles are executed using fluid pressure supplied by the pump 38 allowing apply, release and hold cycles by respective movement of solenoid plungers 62 and 52 until ABS is no longer required, at which time the driver releases pressure from the brake pedal causing a drop in master cylinder 32 pressure. The pump 38 is also turned off at this time. When the above occurs, pressure in the master cylinder 32 and wheel cylinder 34 are equalized via the V-seal and the isolation valve 80 is returned to its original position by the return spring 84. If desired, orifice 95 which is the primary ABS reapply orifice can be relocated upstream of the isolation valve in the pump circuit. Additionally, if desired, the master cylinder and reservoir connections can be reversed.

Figure 2:
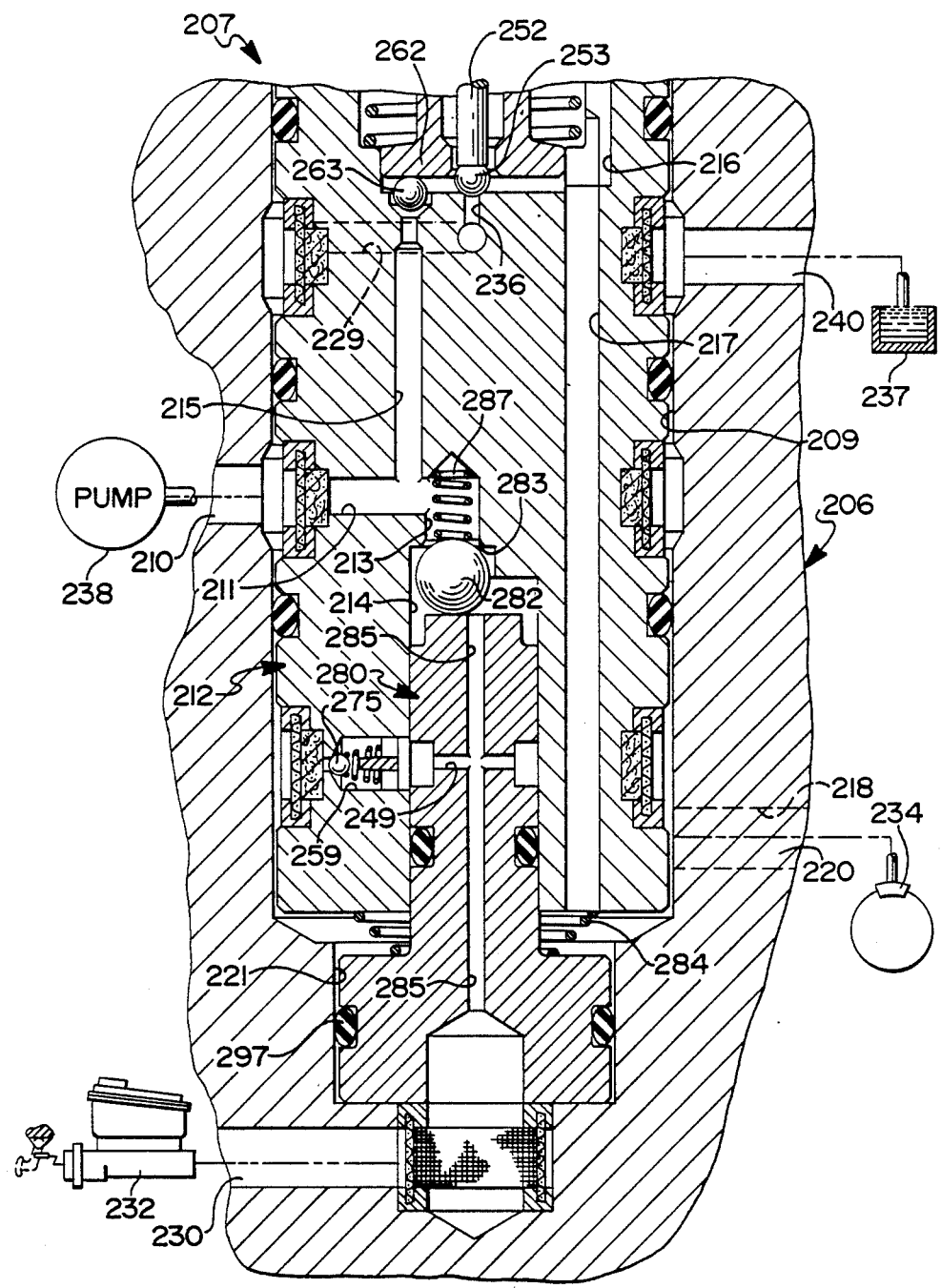
FIG. 2 represents a second embodiment.

Referring to FIG. 2, there is provided a solenoid/-valve integration 207 with master cylinder actuation. The operation of the solenoids and associated first plunger 262, ball 263, second plunger 252, valve member 253 is similar to that explained in regards to solenoid/isolation valve integration 7 previously explained and will therefore be deleted in the interest of brevity. The housing 206 is similar to housing 106 having connections for the reservoir 240, pump 210, wheel 220 and master cylinder 230.

An inner housing 212 is fitted within bore 209 of housing 206. A first fluid path connecting the master cylinder 232 with the wheel cylinder 234 is provided by bores 221, 214, 213, 215, 216, 217, 209 and 218. The first fluid path connecting with pump connection 210 and intersecting the first fluid path is provided by bore 211. A third fluid path connected with the reservoir connection 240 is provided by bores 236 and 229.

An isolation valve shaped like an invert "T" is slidably and sealably mounted with bores 214 and 221 with an longitudinal interior bore 285 and a radial bore 249. O-ring 297 sealably separates wheel pressure from the master cylinder pressure. Radial bore 259, radial bore 249, and bore 285 provide pressure a forth fluid path. The forth fluid path has a check valve 275 which allows flow from the wheel cylinder 234 back to the master cylinder 232 to release the brakes in normal operations. In operation the fluid from the master cylinder connection 230 enters into the isolation valve bore 285 past a spring 287 biased ball 282, continuing through the first fluid path and through the normally open wheel cylinder connection 220. The base brake return is along the forth fluid path to the wheel cylinder connection 220, through the check 275, bores 259, 249 and 285, and back to the master cylinder connection 230. In the base brake mode the isolation valve is in the fully extended position opposite inner housing 212, held in place by a return spring 284 captured between the inner housing 206 and the isolation valve 280.

When the vehicle goes into an impending skid, the electronic control module signals the solenoid 1 and the fluid pump 238. The normally open solenoid 1 coil is energized causing the ball valve 263 to be pressed downward shutting off flow. At the same time the fluid pump is turned on to provide fluid pressure for the ABS stop. The normally closed solenoid 2 coil is then energized releasing pressure from the wheel cylinder 234 back to the reservoir 237. The above change in pressure at the wheel cylinder 234 along with the already high pressure at the master cylinder 232, causes the isolation valve 280 to move into the inner housing 212 until the ball 282 mates on a first fluid path seat 283 on the isolation valve. Thus the term "Master Cylinder Actuation" is utilized. The ABS cycles are executed using fluid pressure supplied by the pump 238 allowing apply, release and hold cycles until ABS is no longer required, at which time the driver releases pressure from the brake pedal causing a drop in master cylinder 232 pressure. At the same time the pump is turned off. When this occurs, pressure in the master cylinder 232 and wheel cylinder 234 are equalized via the check valve 275 and the isolation valve 280 is returned to its original position by the return spring 284.

Response time of the solenoid isolation valve integration 207 is excellent and is the best possible (with the exception of a system using a pressure accumulator) because the pressure is already in place to move the isolation valve 280 due to the master cylinder. Response time for first cycle release is very good because of this, but the first reapply cycle must wait until the pump comes to pressure.

While embodiments of the present invention have been explained, it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. A solenoid/isolation valve integration into a single ended body using pump pressure actuation for use in an anti-lock braking system including a master cylinder, wheel cylinder, reservoir, and a pressurized fluid source, said valve integration in combination comprising:

a housing for mounting said solenoid valve and said isolation valve, said housing including fluid connections for said master cylinder, wheel cylinder, reservoir, and pressurized fluid source, said housing also having a first fluid path connecting said master cylinder to said wheel cylinder, a second fluid path intersecting said first fluid path and connecting with said pressurized fluid source, and a third fluid path intersecting with said first fluid path and connecting with said reservoir;

a first solenoid having a first solenoid actuated valve member for controlling fluid communication in said first fluid path between the said intersection of said first and second fluid paths and said wheel cylinder connection, said first solenoid having a normally open position;

a second solenoid having a second solenoid actuated valve member positionally located on the same side of said first solenoid as said first solenoid valve member and said second solenoid valve member controlling fluid communication in said third fluid path and said second solenoid having a normally closed position; and an isolation valve mounted within said intersection between said first and second fluid paths whereby said isolation valve during normal brake operation allows fluid flow between said master cylinder and said wheel cylinder and when said pressurized fluid source is activated in an anti-lock braking system mode, said pressurized fluid source causes said isolation valve to cut off flow from said master cylinder and to allow flow from said pressurized fluid source to said wheel cylinder.

2. A valve integration as described in claim 1 wherein said isolation valve is slidably mounted within said first fluid path and said first fluid path has a ball and ball valve seat, wherein in said ABS mode said isolation valve positions said ball against said seat to isolate said master cylinder from said wheel cylinder.

3. A valve integration as described in claim 1 wherein said connection of said pressurized fluid source is at a lower elevation of said housing.

4. A valve integration as described in claim 1 further including a check valve mounted within said isolation valve preventing flow from said first fluid path towards said pressurized fluid source.

5. A valve integration as described in claim 1 further including a forth fluid path between said wheel cylinder and said master cylinder within said housing with a check valve mounted therein allowing flow from said wheel cylinder towards said master cylinder.

6. A valve integration as described in claim 5 with a V-seal to perform the check valve function in said forth fluid path.

7. A solenoid/isolation valve integration into a single ended body using pump pressure actuation for use in an anti-lock braking system including a master cylinder, wheel cylinder, a reservoir, and a fluid pump, said valve integration in combination comprising:

a housing for mounting said solenoid valve and said isolation valve, said housing including fluid connections for said master cylinder, wheel cylinder, reservoir and pump, said housing also having a first fluid path connecting said master cylinder to said wheel cylinder with a ball seat, a second fluid path intersecting said first fluid path connecting with said pump, a third fluid path intersecting with said first fluid path and connecting with said reservoir, a fourth fluid path connecting said wheel with said master cylinder;

a first solenoid having a first solenoid actuated valve member for controlling fluid communication in said first fluid path between said intersection of said first and second fluid paths and said wheel cylinder connection, said first solenoid having a normally open position;

a second solenoid having a second solenoid actuated valve member on the same side of said first and and second solenoids as said first solenoid valve member, and said second solenoid valve member controlling fluid communication in said third fluid path, and said second solenoid having a normally closed position;

a check valve 275 mounted within said fourth fluid path allowing flow from said wheel cylinder to said master cylinder;

an isolation valve including a spool positionally biased within said second fluid path and a ball contacted by said spool, said ball being nested in said seat in said first fluid path and said spool having integral therein a check valve allowing flow from said pump toward said intersection of said first and second fluid paths, whereby said isolation valve during normal brake operation allows fluid flow between said master cylinder and said wheel cylinder and when said pump is activated in an anti-lock braking system mode said pump causes said isolation valve to slide within said first fluid path to push said ball against said valve seat isolating said master cylinder from said brake cylinder and allowing flow from said pump to said wheel cylinder in an anti-lock mode.

8. A method of using a pressurized fluid source to activate an isolation valve of an anti-lock braking system solenoid/isolation valve integration utilizing a single ended solenoid body wherein said anti-lock braking system includes a master cylinder, wheel cylinder, reservoir, and a pump, said method in combination comprising:

housing said solenoid valve and said isolation valve in a common housing which includes fluid connections for a master cylinder, wheel cylinder, reservoir, pressurized fluid source and a first fluid path connecting said master cylinder to said wheel cylinder, a second fluid path intersecting said first fluid path and connecting with said pressurized fluid source and a third fluid path intersecting with said first fluid path and connecting with said reservoir;

controlling fluid communication within said first fluid path by a first solenoid actuated valve member in said first fluid path between the intersection of the said first and second fluid paths and said wheel cylinder and biasing said first solenoid valve member to an open position;

controlling fluid communication in said third fluid path with a second solenoid actuated normally closed valve member being positioned on the same side of said first and second solenoids as said first solenoid valve member; and mounting within said intersection of said first and second fluid paths means allowing fluid flow between the said master cylinder and said wheel cylinder in normal braking operation and isolating said first fluid path from said fluid cylinder when said pump is turned on in an anti-lock braking mode.

* * * * *